(12) United States Patent
Divine (10) Patent No.: US 11,103,761 B2
(45) Date of Patent: *Aug. 31, 2021

(54) PROTECTIVE HEADGEAR WITH DISPLAY AND METHODS FOR USE THEREWITH

(71) Applicant: James Shaunak Divine, Austin, TX (US)

(72) Inventor: James Shaunak Divine, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/567,732

(22) Filed: Sep. 11, 2019

(65) Prior Publication Data
US 2020/0009441 A1    Jan. 9, 2020

Related U.S. Application Data

(63) Continuation of application No. 14/953,894, filed on Nov. 30, 2015, now Pat. No. 10,434,396.

(51) Int. Cl.
*A63B 71/10* (2006.01)
*H04N 13/204* (2018.01)
(Continued)

(52) U.S. Cl.
CPC .......... *A63B 71/0605* (2013.01); *A42B 3/042* (2013.01); *A63B 69/0002* (2013.01); *A63B 71/0619* (2013.01); *A63B 71/10* (2013.01); *G06K 9/00724* (2013.01); *G06T 19/006* (2013.01); *H04N 13/204* (2018.05); *H04N 13/344* (2018.05); *A63B 69/002* (2013.01); *A63B 69/0071* (2013.01);
(Continued)

(58) Field of Classification Search
CPC ............ G02B 27/017; G02B 2027/014; G02B 2027/0138; G02B 2027/0187; G02B 13/06; G02B 15/10; G02B 2027/0141; G02B 2027/0178; G02B 27/0172; G02B 27/0093; G02B 2027/0174; A63B 71/0605; A63B 69/0002; A63B 71/0619; A63B 71/10; A63B 3/042; A63B 69/002; A63B 69/0071; A63B 2069/0008; A63B 2071/0666; A63B 2220/806; A63B 2243/0095; H04N 13/344; H04N 13/204; G06K 9/00724; G06T 19/006
See application file for complete search history.

(56) References Cited

U.S. PATENT DOCUMENTS

5,394,564 A * 3/1995 Rodriguez ............. A63B 71/10
                                                    2/424
6,358,164 B1 * 3/2002 Bracewell .......... A63B 71/0605
                                                    473/454
(Continued)

*Primary Examiner* — Irfan Habib
(74) *Attorney, Agent, or Firm* — Garlick & Markison; Bruce E. Stuckman (57) ABSTRACT

Protective headgear includes, for example, a headgear body that is wearable on a head of a baseball umpire. At least one sensor is configured to generate imaging data that includes a batter in proximity to home plate. A processor analyzes the imaging data to determine a strike zone of the batter and to generate augmented reality data in response thereto. A display device generates a heads up display of the strike zone that is viewable to the baseball umpire during a pitch to the batter, based on the augmented reality data. Other embodiments are disclosed.

20 Claims, 6 Drawing Sheets

(51) Int. Cl.
*H04N 13/344* (2018.01)
*A63B 71/06* (2006.01)
*A42B 3/04* (2006.01)
*G06T 19/00* (2011.01)
*A63B 69/00* (2006.01)
*G06K 9/00* (2006.01)

(52) U.S. Cl.
CPC ............... *A63B 2069/0008* (2013.01); *A63B 2071/0666* (2013.01); *A63B 2220/806* (2013.01); *A63B 2243/0095* (2013.01)

(56) References Cited

U.S. PATENT DOCUMENTS

| | | | |
|---|---|---|---|
| 6,704,044 B1 | 3/2004 | Foster | |
| 7,341,530 B2* | 3/2008 | Cavallaro | A63F 13/10 |
| | | | 473/455 |
| 8,043,175 B2* | 10/2011 | Chen | A63B 71/0605 |
| | | | 473/500 |
| 8,335,345 B2* | 12/2012 | White | A63B 24/0021 |
| | | | 382/103 |
| 8,535,182 B2* | 9/2013 | Christenson | A63B 69/0002 |
| | | | 473/456 |
| 8,591,356 B2* | 11/2013 | Walker | A63B 71/0605 |
| | | | 473/456 |
| 8,876,638 B2* | 11/2014 | Paul | A63B 24/0006 |
| | | | 473/451 |
| 9,092,952 B1* | 7/2015 | Daniel | G08B 1/00 |
| 9,269,160 B2* | 2/2016 | Sonabend | H04N 5/272 |
| 9,272,196 B2* | 3/2016 | Kropff | A63B 69/0013 |
| 9,308,426 B2* | 4/2016 | Thurman | A63B 43/008 |
| 9,352,208 B2* | 5/2016 | Davis | A63B 71/0605 |
| 9,955,126 B2* | 4/2018 | Yeo | G01S 13/88 |
| 10,076,698 B2* | 9/2018 | Spivak | G06K 9/00724 |
| 10,099,144 B2* | 10/2018 | Dawe | G06T 7/292 |
| 10,369,445 B2* | 8/2019 | Stemle | G06T 7/11 |
| 10,434,396 B2* | 10/2019 | Divine | H04N 13/344 |
| 10,593,048 B2* | 3/2020 | Keat | G06T 7/248 |
| 10,670,723 B2* | 6/2020 | Davis | G01S 17/46 |
| 10,894,198 B1* | 1/2021 | Teeger | A63B 71/0605 |
| 2002/0049103 A1 | 4/2002 | Treihart | |
| 2003/0171169 A1 | 9/2003 | Cavallaro | |
| 2004/0171412 A1* | 9/2004 | Vollmar, Jr. | A63B 71/12 |
| | | | 463/8 |
| 2008/0318595 A1 | 12/2008 | Rofougaran | |
| 2009/0029754 A1 | 1/2009 | Slocum | |
| 2012/0146291 A1 | 6/2012 | Walker | |
| 2013/0083003 A1 | 4/2013 | Perez | |
| 2014/0100006 A1 | 4/2014 | Jennings | |
| 2014/0121792 A1 | 5/2014 | Jennings | |
| 2014/0206480 A1* | 7/2014 | Davis | A63B 71/0605 |
| | | | 473/455 |
| 2016/0180544 A1* | 6/2016 | Hohteri | G06K 9/00724 |
| | | | 348/157 |
| 2016/0184703 A1 | 6/2016 | Brav | |
| 2016/0296839 A1 | 10/2016 | Brav | |
| 2016/0314620 A1 | 10/2016 | Reilly | |
| 2017/0151484 A1 | 6/2017 | Reilly | |
| 2017/0336509 A1* | 11/2017 | Davis | G09B 19/0038 |
| 2020/0246675 A1* | 8/2020 | Spivak | A63B 71/0605 |

* cited by examiner

PROTECTIVE HEADGEAR WITH DISPLAY AND METHODS FOR USE THEREWITH

CROSS REFERENCE TO RELATED APPLICATIONS

The present U.S. Utility Patent Application claims priority pursuant to 35 U.S.C. § 120 as a continuation of U.S. Utility application Ser. No. 14/953,894, entitled "PROTECTIVE HEADGEAR WITH DISPLAY AND METHODS FOR USE THEREWITH", filed Nov. 30, 2015, which is hereby incorporated herein by reference in its entirety and made part of the present U.S. Utility Patent Application for all purposes.

TECHNICAL FIELD OF THE DISCLOSURE

The present disclosure relates to protective headgear used in baseball, such as an umpire's mask or helmet.

DETAILED DESCRIPTION OF THE DISCLOSURE

Figure 1:
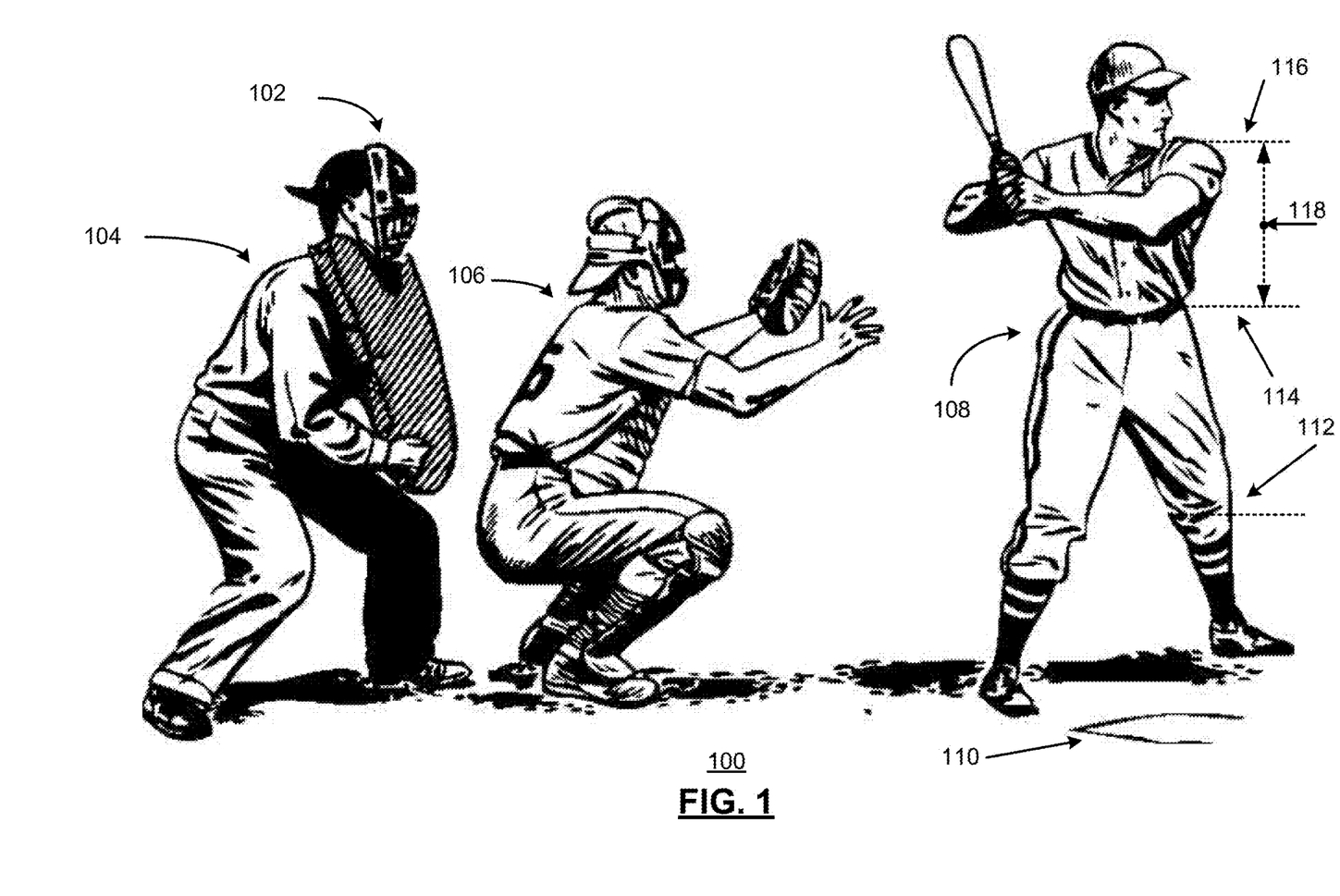
FIG. 1 presents a pictorial representation of an umpire and baseball players in accordance with an embodiment of the present disclosure.

FIG. 1 presents a pictorial representation of an umpire and baseball players in accordance with an embodiment of the present disclosure. An arrangement of an umpire 104, catcher 106 and batter 108 is shown in conjunction with a game of baseball. In particular, the umpire 104, catcher 106 and batter 108 are shown at a time just before a pitch is made to the batter by a pitcher (not shown).

One of the duties of the umpire during a baseball game is to call pitches as either balls or strikes, in accordance with a strike zone. Major League Baseball has established rules that define the strike zone for this purpose. While rules for the strike zone have changed many times over the years, current Rule 2.00 of Major League Baseball defines the strike zone as that area over home plate 110, the upper limit of which is a horizontal line at the midpoint 118 between the top of the shoulders 116 and the top of the uniform pants 114, and the lower level is a line at the hollow beneath the kneecap 112. As defined, the strike zone is not only dependent on the particular player that is batting, but also on the batting stance employed by that player.

In various embodiments, protective headgear 102 such as a mask or helmet, is wearable on the head of the umpire 104 to not only protect the umpire from injury from a pitch that may not be caught by the catcher 106, but also to provide a heads up display of the strike zone that is viewable to the umpire during the pitch. In particular, the heads up display of the strike zone can present a virtual strike zone. This virtual strike zone eliminates the need for the umpire to determine the correct strike zone boundaries for each batter. This enables the umpire to make better calls by allowing the umpire to focus his or her attention on the relationship of the pitch to the strike zone.

Further details regarding the protective headgear 102 including many optional functions are features are presented in conjunction with FIGS. 2-7 that follow.

Figure 2:
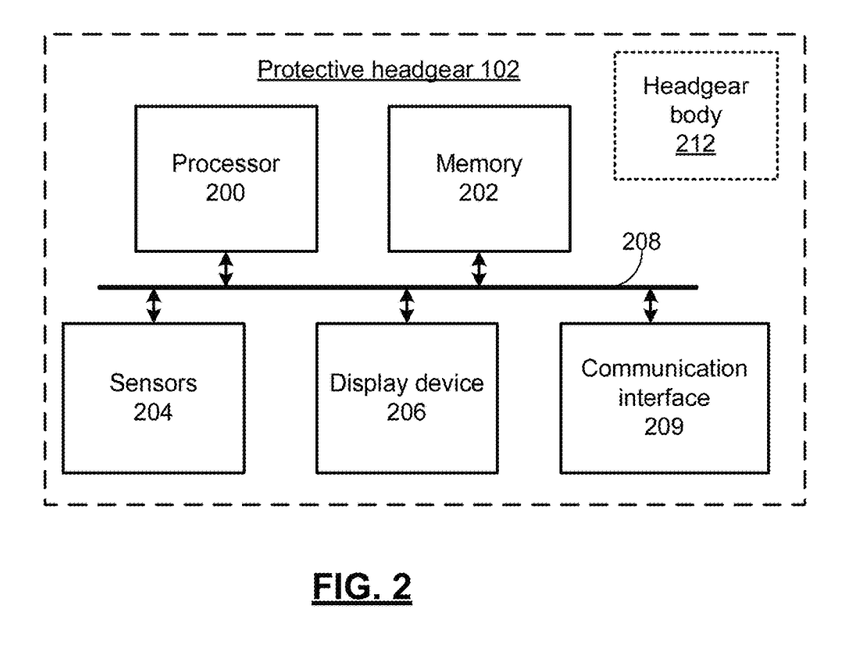
FIG. 2 presents a schematic block diagram of protective headgear in accordance with an embodiment of the present disclosure.

FIG. 2 presents a schematic block diagram of protective headgear in accordance with an embodiment of the present disclosure. In particular, protective headgear 102 includes a headgear body 212 that is wearable on a head of a baseball umpire. One or more sensors 204 generate imaging data that includes a batter in proximity to home plate. The processor 200 operates in conjunction with the memory 202 to analyze the imaging data to determine a strike zone of the batter and to generate augmented reality data in response thereto. The display device 206 generates a heads up display of the strike zone that is viewable to the baseball umpire during a pitch to the batter, based on the augmented reality data. A communication interface 209 can send the heads up display data generated by the protective headgear to a remote station that collects the data for analysis, that can be used in a broadcast feed of the game to replay a patch or other play, and that can receive game data such as ball and strike data and the number of outs from a handheld device associated with the umpire or other remote device. In various embodiments, the communication interface includes wireless radio that operates in accordance with a wireless network protocol such as a Bluetooth protocol, ZigBee protocol, 802.11 wireless protocol, 3G, 4G or higher cellular data protocol or other data communications protocol.

While a particular architecture is shown that includes bus 208, other architectures including two or more buses and/or direct connectivity between elements can likewise be implemented. Further, the protective headgear can include one or more additional elements, including a power source, user interface and/or other elements not expressly shown.

In various embodiments the sensor(s) 204 include visual imaging sensors such as a charge coupled device, digital video camera or other digital imaging sensor that captures visual images of the batter and of home plate. While a single visual imaging sensor can be employed, two or more sensors 204 can be employed in order to generate a stereoscopic image, a three-dimensional image or other image that provides a depth of field and allows for more accurate strike zone determination.

The processor 200 can execute a pattern recognition application that identifies points in the image, such as the boundaries of home plate, the bottom of the kneecap, top of the shoulders and top of the uniform pants of the batter that can be used to generate the boundaries of the strike zone. While this analysis can be performed directly on an image that contains a batter and home plate, in some embodiments, the pattern recognition application can be aided by modifications to the uniform of the batter. For example, the uniform of the batter can include a plurality of visible targets of a known configuration that are placed at key points on the uniform, such as the bottom of the kneecap, top of the shoulders and top of the uniform pants of the batter that can aid in the determination of these key points by the pattern recognition application. In particular, the processor 200 can analyze the imaging data from the sensor(s) 204 to determine the strike zone of the batter, based on the corresponding positions of these visible targets.

The use of multiple sensors 204 allows the processor 200 to construct a three-dimensional region corresponding to the strike zone and the trajectory of the ball in order to determine if the ball intersect the three-dimensional region at any point in order to more accurately call a ball or strike.

It should be noted that the image data is generated and analyzed on a realtime basis to provide a realtime display of a virtual strike zone that is constantly updated based on the position of the umpire, the orientation of his or her head, and the stance of the batter. In various embodiments, the pattern recognition application further operates to recognize the presence or absence of a batter in a batting stance and only generates the virtual strike zone display in circumstances where batter is in a batting stance in preparation for a pitch. In this fashion, the heads-up display of the strike zone only appears when needed and does not encumber the vision of the umpire during other calls, such as during a tag or other play at the plate or other call by the home plate umpire.

While the foregoing description has focused on the use of visual imaging sensors, other imaging technologies can be used as well. In various other embodiments, the sensors 204 can include microwave or millimeter wave devices that transmit a microwave or millimeter wave signal and capture image data in the form of a reflected millimeter wave or microwave image of the batter and home plate. While this analysis can also be performed directly on an image that contains a batter and home plate, in some embodiments, the pattern recognition application can be also aided by modifications to the uniform of the batter. For example, the uniform of the batter can include a plurality of microwave or millimeter wave reflectors that are placed at key points on the uniform, such as the bottom of the kneecap, top of the shoulders and top of the uniform pants of the batter that can aid in the determination of these key points by the pattern recognition application. In a similar fashion home plate and the baseball can be also equipped with one or more millimeter wave or microwave reflectors or surfaces that aids the pattern recognition application in determining the strike zone of the batter, based on the corresponding positions of these microwave or millimeter wave reflectors.

In further embodiments, the sensors 204 can include an infrared sensor or sensors that capture infrared image data. While this analysis can also be performed directly on an image that contains a batter and home plate, in some embodiments, the pattern recognition application can be also aided by modifications to the uniform of the batter. For example, the uniform of the batter can include a plurality of infrared reflectors that are placed at key points on the uniform, such as the bottom of the kneecap, top of the shoulders and top of the uniform pants of the batter and/or the ball that reflect infrared energy from the sun and can aid in the determination of these key points by the pattern recognition application. In particular, the processor 200 can analyze the imaging data from the sensor(s) 204 to determine the strike zone of the batter, based on the corresponding positions of these infrared reflectors.

Figure 3:
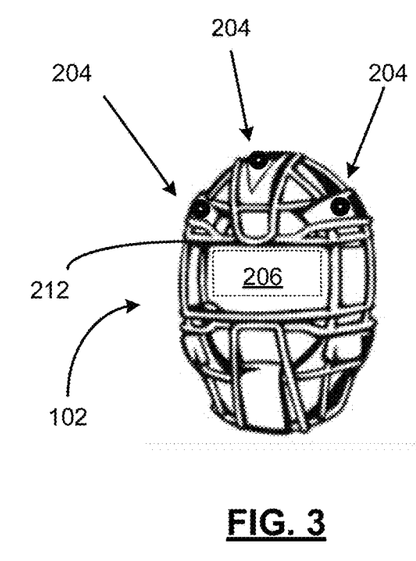
FIG. 3 presents a pictorial representation of protective headgear in accordance with an embodiment of the present disclosure.

FIG. 3 presents a pictorial representation of protective headgear in accordance with an embodiment of the present disclosure. In particular, protective headgear 102 is configured as a mask or helmet worn by a home plate umpire. While a particular mask configuration is shown, other mask configurations can likewise be employed. An example position of display device 206 is shown along with the positions of three sensors 204.

The display device 206 can be a helmet mounted display or other heads up display that provides an augmented reality image of the umpire's field of view. In particular, the augmented reality image can include the virtual strike zone determined by the processor in response to image data from the sensors 204. For example, the display device 206 includes a transparent display element that presents the virtual strike zone without requiring the umpire to look away from their usual viewpoints. The display device 206 can include a video generator that generates rendered video based on the augmented reality data representing the strike zone, and a projector unit that projects the video on a combiner, such as a piece of safety glass with an appropriate coating or other transparent screen that reflects the light from the projector while passing other wavelengths of light. The projector unit and combiner can operate based on a light emitting diode or liquid crystal display that produces an image of the strike zone (a virtual strike zone) within the normal field of view of the umpire.

Figure 4:
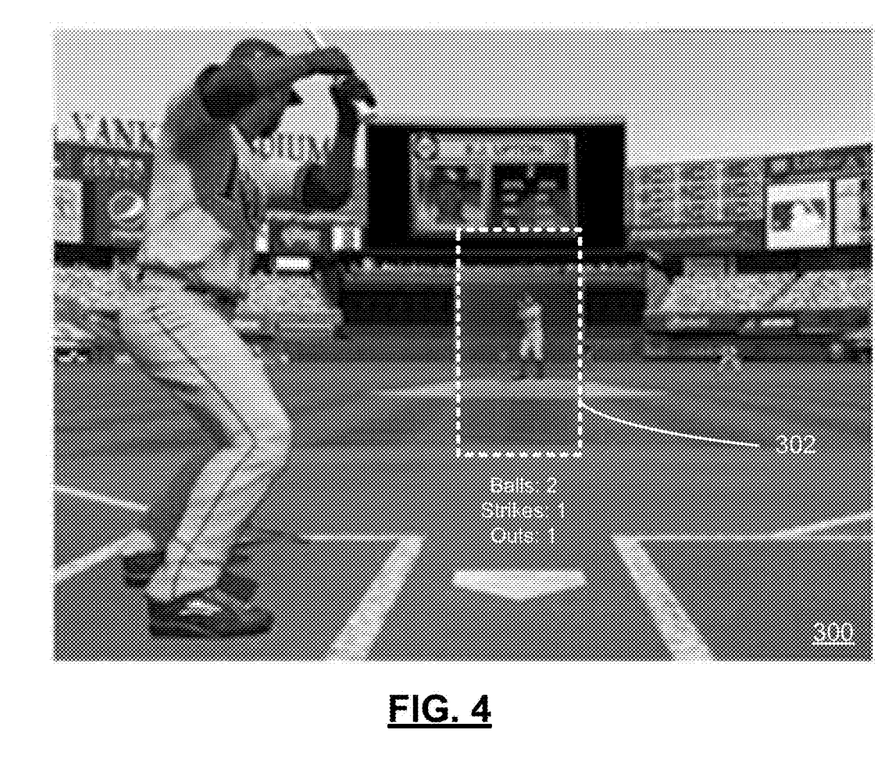
FIG. 4 presents a graphical representation of a field of view in accordance with an embodiment of the present disclosure.

FIG. 4 presents a graphical representation of a field of view in accordance with an embodiment of the present disclosure. In particular, a field of view 300 is shown as seen by an umpire wearing the protective headgear. As previously discussed, the protective headgear analyzes imaging data of the batter and home plate to determine a strike zone that reflects the batter and the batter's current batting stance. In the example shown, the augmented reality data generated by the protective headgear includes a region outline 302 that outlines the position of the strike zone in the heads up display of the protective headgear.

As previously discussed, the image data is generated and analyzed by the protective headgear on a realtime basis to provide a realtime display of a virtual strike zone that is constantly updated based on the position of the umpire, the orientation of his or her head, and the stance of the batter. In the configuration shown, the pattern recognition application has recognized the presence or absence of the batter in a batting stance and has generated the virtual strike zone display because the batter is determined to be in a batting stance in preparation for a pitch. In other circumstances, prior to and after the pitch, the outline 302 is not presented.

While an augmented reality data in the form of region outline 302 is presented, in other examples, the virtual strike zone can be indicated by a colored region, shading or other graphical imagery. In addition, the color of the strike zone outline or shading can be changed based on whether a ball or strike was detected—to red for a strike and green for a ball, for example. In addition to presenting the virtual strike zone on the heads up display, other game data received via the communication interface can also be displayed such as the ball count, strike count and number of outs as shown. It should be noted that other game data such as inning number, score etc. can be received and displayed in a similar fashion.

In addition or in the alternative, while the foregoing has focused on the use of the protective headgear to produce augmented reality data merely for calling balls and strikes, image data can be analyzed and augmented reality data can be presented on a heads-up display that aids the umpire in making other calls such as whether a ball is fair or foul, whether a tag has been made, whether a pitcher has balked and/or other calls. In addition or in the alternative, in embodiments where sensors 204 operate based on visual imaging, video of a particular play viewed by the umpire can be recorded. The protective headgear can include an optional user interface that allows the umpire to retrieve the recorded video for playback via the display device 206 to review a call using the protective headgear to check its accuracy and/or overturn a previous call.

It should also be noted that while the foregoing has described the use of the protective headgear to generate an augmented reality display for a baseball umpire, the use of similar augmented reality gear that is either incorporated in or separate from protective headgear, can likewise be used by other baseball umpires, other umpires and referees to assist in making game calls in other sports including football, soccer, hockey, lawn tennis, table tennis, basketball, volleyball, track and field and/or other sports.

Figure 5:
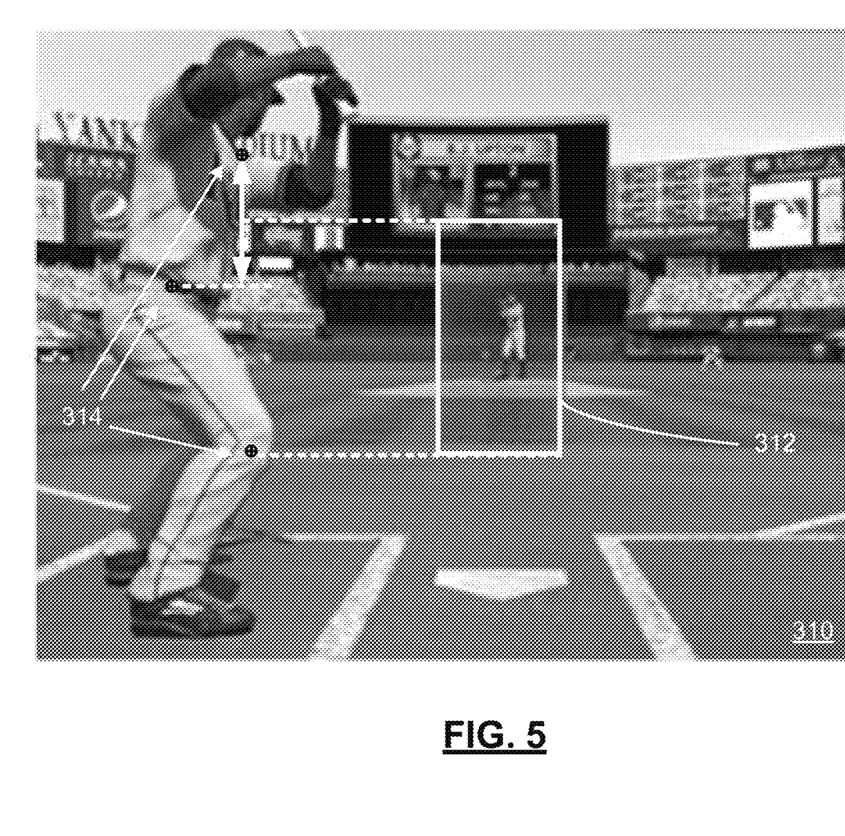
FIG. 5 presents a graphical representation of imaging data in accordance with an embodiment of the present disclosure.

FIG. 5 presents a graphical representation of imaging data in accordance with an embodiment of the present disclosure. In particular, an embodiment is presented where the protective headgear includes visual imaging sensors that capture a visual image 310 of the batter and of home plate.

The pattern recognition application identifies points in the image 310, such as the boundaries of home plate, the bottom of the kneecap, top of the shoulders and top of the uniform pants of the batter that can be used to generate the boundaries of the strike zone 312. As discussed, this analysis can be performed directly on an image 310. In the embodiment shown however, the uniform of the batter includes a plurality of visible targets 314 of a known configuration that are placed at key points on the uniform, such as the bottom of the kneecap, top of the shoulders and top of the uniform pants of the batter that can aid in the determination of these key points by the pattern recognition application. In particular, the pattern recognition application can analyze the image 310 to determine the strike zone of the batter 312 based on corresponding positions of the plurality of visible targets. While particular targets are shown with a particular shape and a particular pattern, other shapes and patterns can likewise be employed that either include a team's logo or otherwise are customized to a particular team, or that are standardized to a group of teams, such as all the teams in a league. In the example shown, the strike zone 312 is determined by the pattern recognition application as the region above home plate between the bottom of the kneecap and the midpoint between the top of the batter's pants and the batter's shoulders.

Figure 6:
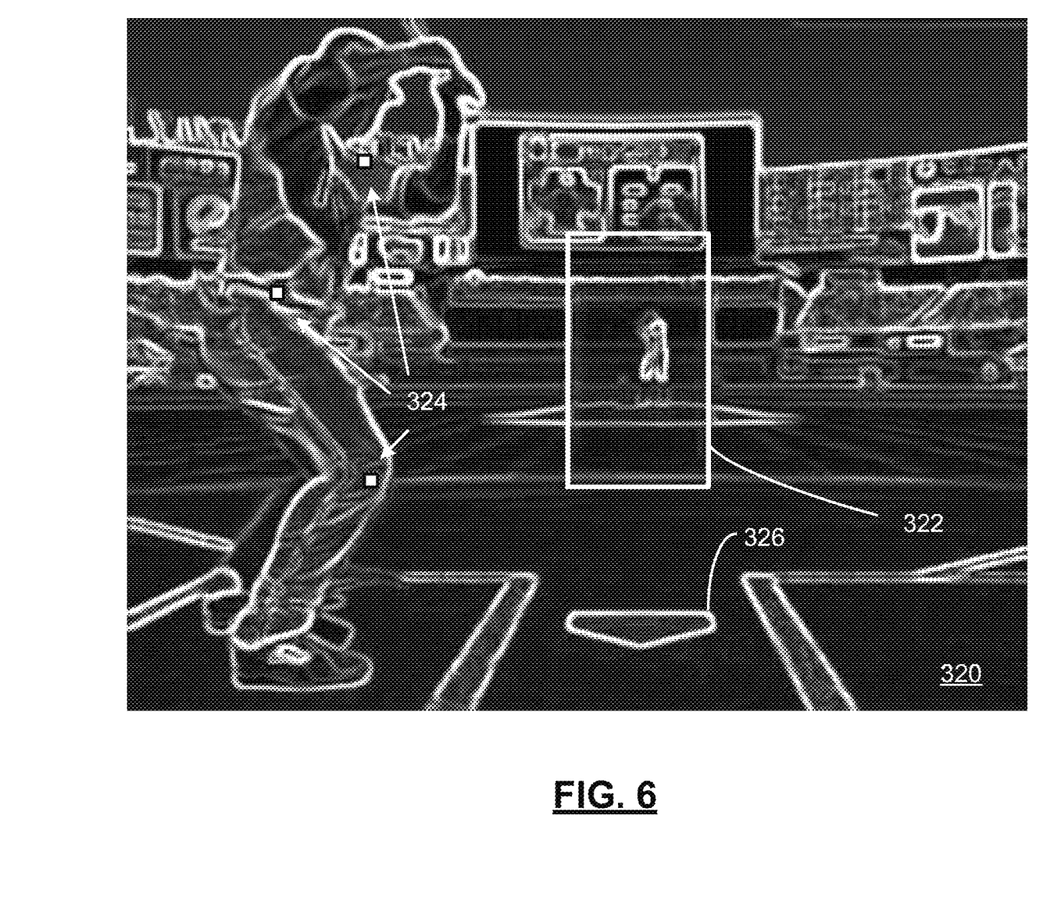
FIG. 6 presents a graphical representation of imaging data in accordance with an embodiment of the present disclosure.

FIG. 6 presents a graphical representation of imaging data in accordance with an embodiment of the present disclosure. In particular, an embodiment is presented where the protective headgear includes millimeter wave imaging sensors that capture a millimeter wave image 320 of the batter and of home plate.

As in the previous example, the pattern recognition application identifies points in the image 320, such as the boundaries of home plate, the bottom of the kneecap, top of the shoulders and top of the uniform pants of the batter that can be used to generate the boundaries of the strike zone 322. As discussed, this analysis can be performed directly on an image 320. In the embodiment shown however, the uniform of the batter includes a plurality of millimeter wave reflectors 324 that are placed at key points on the uniform, such as the bottom of the kneecap, top of the shoulders and top of the uniform pants of the batter that can aid in the determination of these key points by the pattern recognition application by providing distinct points of high reflection that show up as points of high "brightness" in the image 320. While particular point reflectors 324 are shown with a square shape, other geometrical shapes, lines, etc. can likewise be employed. The home plate is similarly outlined with reflective material 326. The pattern recognition application can analyze the image 310 to determine the strike zone of the batter 322 based on corresponding positions of these reflections.

In the example shown, the strike zone 322 is determined by the pattern recognition application as the region above home plate between the bottom of the kneecap and the midpoint between the top of the batter's pants and the batter's shoulders.

Figure 7:
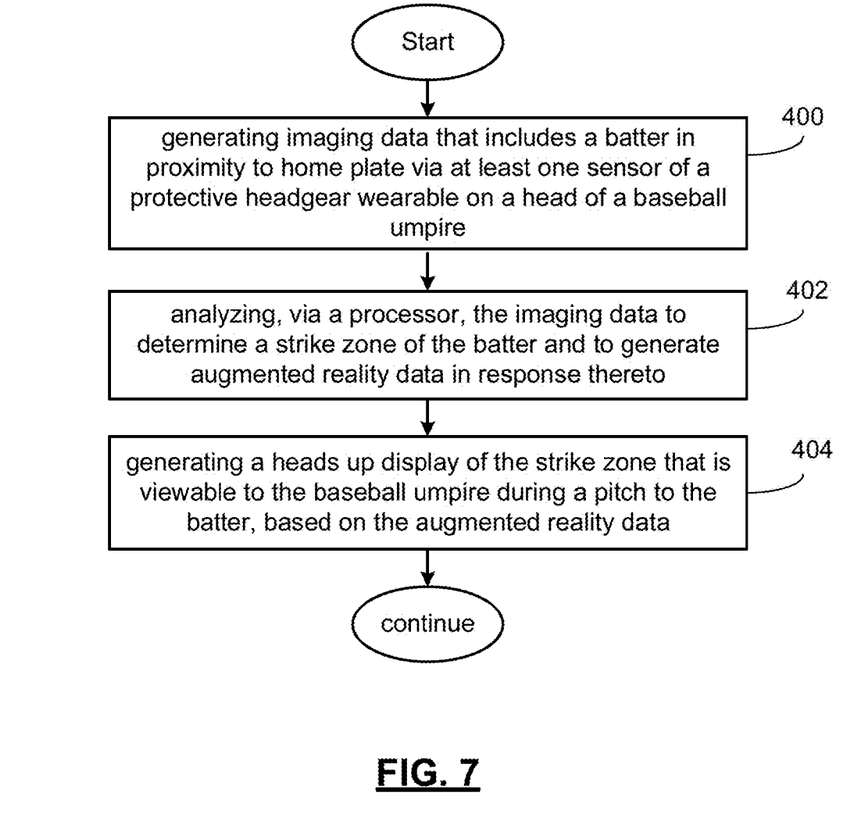
FIG. 7 presents a flowchart representation of a method in accordance with an embodiment of the present disclosure.

FIG. 7 presents a flowchart representation of a method in accordance with an embodiment of the present disclosure. In particular, a method is presented for use with one or more functions and features described in conjunction with FIGS. 1-6. Step 400 includes generating imaging data that includes a batter in proximity to home plate via at least one sensor of a protective headgear wearable on a head of a baseball umpire. Step 402 includes analyzing, via a processor, the imaging data to determine a strike zone of the batter and to generate augmented reality data in response thereto. Step 404 includes generating a heads up display of the strike zone that is viewable to the baseball umpire during a pitch to the batter, based on the augmented reality data.

In various embodiments, the imaging data includes a stereoscopic image of the batter. The imaging data can include at least one visual image, infrared image, millimeter wave image and/or microwave image of the batter and of home plate. The uniform of the batter can include a plurality of visible targets and analyzing the imaging data to determine the strike zone of the batter can include determining corresponding positions of the plurality of visible targets. The uniform of the batter can include a plurality of millimeter wave reflectors and analyzing the imaging data to determine the strike zone of the batter can include determining corresponding positions of the plurality of millimeter wave reflectors. The uniform of the batter can include a plurality of infrared reflectors and analyzing the imaging data to determine the strike zone of the batter can include determining corresponding positions of the plurality of infrared targets.

The augmented reality data can includes a region outline that outlines the strike zone in the heads up display and/or a colored region corresponding to the strike zone in the heads up display.

While the description above has set forth several different modes of operation, the devices described here may simultaneously be in two or more of these modes unless, by their nature, these modes necessarily cannot be implemented simultaneously. While the foregoing description includes the description of many different embodiments and implementations, the functions and features of these implementations and embodiments can be combined in additional embodiments of the present disclosure not expressly disclosed by any single implementation or embodiment, yet nevertheless understood by one skilled in the art when presented this disclosure.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" may be used in the description of one or more of the embodiments to implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. Protective headgear comprising:
    a headgear body that is wearable on a head of a baseball umpire;
    at least one sensor, coupled to the headgear body, including at least one camera configured to that generates imaging data that includes a visual image of a batter in proximity to home plate, wherein a uniform worn by the batter has pants and wherein the batter has a kneecap and shoulders;
    a processor, coupled to the sensor, that operates in conjunction with a memory and is configured to:
    analyze the imaging data via a pattern recognition application to recognize a presence or absence of a batting stance of the batter;
    analyze the imaging data via the pattern recognition application to determine a strike zone of the batter by identifying a region above the home plate between a bottom of the kneecap and a midpoint between a top of the pants and a top of the shoulders; and
    generate augmented reality data that indicates the strike zone, only when the batter is in the batting stance;
    a display device, coupled to the headgear body and the processor, configured to that generates, based on the augmented reality data that indicates the strike zone, a heads up display of the strike zone that is viewable to the baseball umpire during a pitch to the batter.

2. The protective headgear of claim 1 wherein the at least one camera includes a plurality of cameras that generate a stereoscopic image of the batter.

3. The protective headgear of claim 1 wherein the augmented reality data includes a region outline that outlines the strike zone in the heads up display.

4. The protective headgear of claim 1 wherein the augmented reality data includes a colored region corresponding to the strike zone in the heads up display.

5. The protective headgear of claim 1 wherein the at least one camera includes a plurality of cameras and the strike zone of the batter is generated as a three dimension region.

6. The protective headgear of claim 5 wherein the processor analyzes a trajectory of a ball during the pitch to the batter in relation to the three dimension region to generate a ball or strike determination.

7. The protective headgear of claim 6 wherein the ball includes an imaging reflector and wherein the processor analyzes the imaging data to determine the trajectory of the ball based an identification of a signal from the imaging reflector.

8. The protective headgear of claim 6 wherein processor adjusts a color corresponding to the strike zone in the augmented reality data, based on the ball or strike determination.

9. The protective headgear of claim 1 further comprising a communication interface that receives game data, wherein the augmented reality data further includes the game data.

10. The protective headgear of claim 9 wherein the game data includes ball and strike data and a number of outs.

11. Protective headgear comprising:
    a headgear body that is wearable on a head of a baseball umpire;
    at least one sensor, coupled to the headgear body, including at least one camera that generates imaging data that includes a visual image of a batter in proximity to home plate, wherein a uniform worn by the batter has pants and wherein the batter has a kneecap and shoulders;
    a processing system, coupled to the sensor, that includes a processor and a memory that stores operational instructions, wherein the processor executes the operational instructions to perform operations that include:
        analyzing the imaging data via a pattern recognition to recognize a presence or absence of a batting stance of the batter;
        analyzing the imaging data to determine a strike zone of the batter by identifying a region above the home plate between a bottom of the kneecap and a midpoint between a top of the pants and a top of the shoulders; and
        generating augmented reality data that indicates the strike zone, only when the batter is in the batting stance;
    a display device, coupled to the headgear body and the processing system, that generates, based on the augmented reality data that indicates the strike zone, a heads up display of the strike zone that is viewable to the baseball umpire during a pitch to the batter.

12. The protective headgear of claim 11 wherein the at least one camera includes a plurality of cameras that generate a stereoscopic image of the batter.

13. The protective headgear of claim 11 wherein the augmented reality data includes a region outline that outlines the strike zone in the heads up display.

14. The protective headgear of claim 11 wherein the augmented reality data includes a colored region corresponding to the strike zone in the heads up display.

15. The protective headgear of claim 11 wherein the at least one camera includes a plurality of cameras and the strike zone of the batter is generated as a three dimension region.

16. The protective headgear of claim 15 wherein the operations further include:
    analyzing a trajectory of a ball during the pitch to the batter in relation to the three dimension region to generate a ball or strike determination.

17. The protective headgear of claim 16 wherein the ball includes an imaging reflector and wherein the processor analyzes the imaging data to determine the trajectory of the ball based an identification of a signal from the imaging reflector.

18. The protective headgear of claim 16 wherein operations further include:

adjusting a color corresponding to the strike zone in the augmented reality data, based on the ball or strike determination.

19. The protective headgear of claim 11 further comprising a communication interface that receives game data, wherein the augmented reality data further includes the game data.

20. The protective headgear of claim 19 wherein the game data includes ball and strike data and a number of outs.

* * * * *